(12) United States Patent
Lee

(10) Patent No.: US 7,110,373 B2
(45) Date of Patent: Sep. 19, 2006

(54) APPARATUS AND METHOD FOR CONTROLLING MEMORY FOR A BASE STATION MODEM

(75) Inventor: Dong-Sun Lee, Kyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 10/325,905

(22) Filed: Dec. 23, 2002

(65) Prior Publication Data

US 2003/0131209 A1    Jul. 10, 2003

(30) Foreign Application Priority Data

Dec. 26, 2001    (KR)    ............ 10-2001-0085434

(51) Int. Cl.
*G06F 12/00*    (2006.01)

(52) U.S. Cl. .............. 370/328; 370/382; 370/383; 370/395.7; 370/431; 375/222; 711/153; 711/170; 711/206; 711/209; 711/213; 711/217; 711/220; 711/221

(58) Field of Classification Search ........ 370/328, 370/329, 382, 383, 395.7, 431; 375/222; 711/129, 153, 170, 173, 206, 209, 213, 217, 711/220, 221; 725/99, 111; H04M 11/06, H04M 1/21
See application file for complete search history.

(56) References Cited

U.S. PATENT DOCUMENTS

| | | | | |
|---|---|---|---|---|
| 4,432,051 A | * | 2/1984 | Bogaert et al. | ............ 717/127 |
| 5,109,522 A | * | 4/1992 | Lent et al. | .................. 709/213 |
| 5,873,127 A | * | 2/1999 | Harvey et al. | .............. 711/206 |
| 5,950,211 A | * | 9/1999 | Shealy | ....................... 707/204 |
| 6,286,092 B1 | * | 9/2001 | Frank et al. | ................. 711/207 |
| 6,681,239 B1 | * | 1/2004 | Munroe et al. | ............ 718/104 |
| 6,687,767 B1 | * | 2/2004 | Butterfield | .................. 710/22 |
| 2002/0126673 A1 | * | 9/2002 | Dagli et al. | ................. 370/392 |
| 2003/0021338 A1 | * | 1/2003 | Mazzoni et al. | ............ 375/219 |
| 2003/0084212 A1 | * | 5/2003 | Butterfield | .................... 710/22 |
| 2003/0147410 A1 | * | 8/2003 | Hsu et al. | .................... 370/412 |

* cited by examiner

*Primary Examiner*—Christian P. Chace
(74) *Attorney, Agent, or Firm*—Fleshner & Kim, LLP

(57) ABSTRACT

An apparatus and a method for controlling memory in a base station modem supporting multi-users including a memory divided into logical blocks for supporting the multi-users, and a controller for allocating the memory blocks dynamically in hardware. This allows non-continuous memory allocation and the size of memory can be increased or reduced during operation through the dynamic allocation structure of the memory.

18 Claims, 7 Drawing Sheets

FIG.2

| START ADDRESS[0] |
|---|
| START ADDRESS[1] |
| ... |
| START ADDRESS[15] |

FIG.3

| JUMP ADDRESS[0] | END OF BLOCK[0] |
|---|---|
| JUMP ADDRESS[1] | END OF BLOCK[1] |
| ... | ... |
| JUMP ADDRESS[15] | END OF BLOCK[15] |

FIG.4

| | |
|---|---|
| 0 | 0 |
| | 1 |
| | 2 |
| | ... |
| | 15 |
| 1 | 0 |
| | 1 |
| | 2 |
| | ... |
| | 15 |
| 2 | 0 |
| | 1 |
| | 2 |
| | ... |
| | 15 |
| ... | 0 |
| | 1 |
| | 2 |
| | ... |
| | 15 |
| 1023 | 0 |
| | 1 |
| | 2 |
| | ... |
| | 15 |

FIG.6

| BLOCK ADDRESS[0] | OFFSET ADDRESS[0] |
|---|---|
| ... | ... |
| BLOCK ADDRESS[1] | OFFSET ADDRESS[1] |
| BLOCK ADDRESS[15] | OFFSET ADDRESS[15] |

| WRITE | BLOCK ADDRESS | OFFSET ADDRESS | PHYSICAL ADDRESS |
|---|---|---|---|
| 0x1 | 0x0 | 0x6 | 0x6 |
| 0x2 | 0x0 | 0xA | 0xA |
| 0x3 | 0x1 | 0x6 | 0x16 |
| 0x4 | 0x1 | 0xA | 0x1A |
| 0x5 | 0x2 | 0x6 | 0x26 |
| ... | ... | ... | ... |

FIG.10

| WRITE | BLOCK ADDRESS | OFFSET ADDRESS | JUMP ADDRESS/ END OF BLOCK | END OF BLOCK ENABLE |
|---|---|---|---|---|
| 0x1 | 0x0 | 0xD | 0xF/0 | 0 |
| 0x2 | 0x0 | 0xF | 0x3/1 | 0 |
| 0x3 | 0x1 | 0xD | 0xF/0 | 0 |
| 0x4 | 0x1 | 0xF | 0x3/1 | 0 |
| ... | ... | ... | ... | ... |
| 0x35 | 0x1B | 0xD | 0xF/0 | 1 |
| 0x36 | 0x1B | 0xF | 0x3/1 | 1 |
| 0x37 | 0x1B | 0x3 | 0x1/0 | 1 |
| 0x38 | 0x1B | 0x1 | 0xD/0 | 1 |
| 0x39 | 0x1C | 0xD | 0xF/0 | 1 |
| 0x40 | 0x1C | 0xF | 0x3/1 | 1 |

APPARATUS AND METHOD FOR CONTROLLING MEMORY FOR A BASE STATION MODEM

BACKGROUND OF THE INVENTION

1. Field of the Invention

The present invention relates to an apparatus for controlling a memory in a base station modem, and more particularly, to an apparatus and a method for controlling a memory in a base station modem supporting multiple users.

2. Background of the Related Art

Recently, as mobile terminals proliferate rapidly due to increasing mobile subscribers, the need for using limited radio resources effectively is highlighted. The quality of mobile communication service varies with the designs and features of base stations that connect the mobile subscribers to enable communication with each other.

The memory of a base station modem is typically a high priced system resource, and various algorithms for managing the memory more efficiently are being suggested.

Generally, there are two approaches for allocating memory areas. A first method is a dynamic allocation method in which the memory is allocated to respective users according to space requests required by the user connected to the modem. A second method is a fixed allocation method, in which the memory is divided into blocks of certain sizes that are defined in advance, and a block having a corresponding requested size is selected and allocated when memory is requested.

Both of the memory allocation methods described above may be performed by software. However, in case of the dynamic allocation, an additional step of calculating synchronization for re-allocating the memory to the user using the software is required. In addition, since the blocks of the memory are fixed in the fixed allocation, the memory cannot be allocated for a request greater than the allocated blocks, and the memory area is divided repeatedly for the requests smaller than the blocks. Therefore, the memory may not be further allocated, even if there is sufficient memory available to do so.

That is, the conventional memory allocating method for the base station modem is not able to perform non-continuous memory allocation when allocating the memory for multiple users, and the dynamic memory re-configuration cannot be made during operation.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and a method for controlling a memory in a base station modem by which non-continuous memory allocation can be made.

Another object of the present invention is to provide an apparatus and a method for controlling a memory in a base station modem by which non-continuous memory allocation can be made in a modem of a base station and a memory can be re-configured during operation.

Another object of the present invention is to provide an apparatus and a method for controlling a memory in a base station modem that are able to control an expansion memory of a base station modem using software.

To achieve these objects of the present invention, as embodied and broadly described herein, there is provided an apparatus for controlling a memory in a base station modem comprising: a memory which is divided into N logical blocks; a resource management controller for allocating memory block variably; a start address table for storing a start pointer value of allocated memory block; a jump address table for storing a pointer value which assigns a position of a next memory block which is logically continued in the memory; and an address controller for controlling operations according to signals of the start address table and the jump address table and a request signal inputted from outer side.

In addition, there is provided an apparatus for controlling a memory in a base station modem comprising: a memory divided into N logical blocks for supporting multi-user; a resource management controller for allocating memory blocks to respective users; a start address table for storing a start pointer value of the allocated memory block; a jump address table for storing a pointer value of a next memory block which is logically continued; a read address controller for controlling read operation of the memory according to signals of the start address table and the jump address table and an outer read request signal; and a write address controller for controlling write operation of the memory according to signals of the start address table and of the jump address table and an outer write signal.

Also, there is provided a method for controlling a memory in a base station modem according to the present invention comprising: a step of allocating memory blocks to users sequentially; a step of performing an operation requested by the user on the allocated memory block; and a step of setting next memory block.

Also, there is provided a method for controlling a memory in a base station modem comprising: a step of allocating a channel to a user and allocating memory blocks for the channel; a step of receiving a request signal; a step of performing an operation according to the request and calculating a next address; a step of requesting an expanded memory block; a step of allocating an expanded memory block among available memory blocks as much as the user requires; and a step of performing an operation in the expanded memory block and calculating a next address.

To achieve these and other advantages in whole or in part and in accordance with the purpose of the present invention, as embodied and broadly described herein, there is provided an apparatus for controlling a memory of a base station modem a memory divided into N logical blocks where N is a prescribed natural number, a resource management controller that allocates memory blocks, a start address table that stores a start pointer value of an allocated memory block, a jump address table that stores a pointer value designating a position of a next memory block logically continued in the memory, and an address controller that controls operations according to signals of the start address table and the jump address table and an input request signal.

To further achieve these and other advantages in whole or in part and in accordance with the purpose of the present invention, as embodied and broadly described herein, there is provided an apparatus for controlling a memory of a base station modem including a memory divided into N logical blocks for supporting multi-users (N=discretionary natural number), a resource management controller for allocating memory blocks to respective users, a start address table for storing a start pointer value of the allocated memory block, a jump address table for storing a pointer value of a next memory block, a read address controller for controlling a read operation of the memory according to signals of the start address table and the jump address table, and an outer read request signal, and a write address controller for controlling a write operation of the memory according to signals of the start address table and the jump address table, and an outer read request signal.

To further achieve these and other advantages in whole or in part and in accordance with the purpose of the present invention, as embodied and broadly described herein, there is provided a method for controlling a memory of a base station modem that includes allocating memory blocks to users sequentially; performing operations required by a user on the allocated memory blocks; and designating a next memory block.

To further achieve these and other advantages in whole or in part and in accordance with the purpose of the present invention, as embodied and broadly described herein, there is provided a method for controlling a memory of a base station modem that includes allocating a channel to a user, and allocating a memory block for the channel, receiving a request signal, calculating a next address after performing operations according to the request signal, being required to use at least one expanded memory block, allocating an expanded memory block as much as the user requires among available memory blocks, and performing operations in the expanded memory block and calculating a next address.

To further achieve these and other advantages in whole or in part and in accordance with the purpose of the present invention, as embodied and broadly described herein, there is provided an apparatus for controlling a memory of a base station modem that includes a memory divided into N logical blocks where N is a discretionary natural number, a controller allocating memory blocks variably, a first region in memory ($RM_1$) for storing a start pointer value of the allocated memory block, a second region in memory ($RM_2$) for storing a pointer value designating a position of a next memory block logically continued in the memory, and a controller for controlling operations according to signals of the first memory region ($RM_1$) and the second memory region ($RM_2$) and an input request signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a view showing an exemplary embodiment of a start address table format according to the present invention;

FIG. 3 is a view showing an exemplary embodiment of a jump address table format according to the present invention;

FIG. 4 is a view showing an exemplary embodiment of a memory format according to the present invention;

FIG. 6 is a view showing an exemplary embodiment of a backup address unit according to the present invention;

FIG. 10 is a view showing an exemplary address table according to memory sections used of an expanded memory according to the present invention.

DETAILED DESCRIPTION OF PREFERRED EMBODIMENTS

Reference will now be made in detail to the preferred embodiments of the present invention, examples of which are illustrated in the accompanying drawings.

Figure 1:
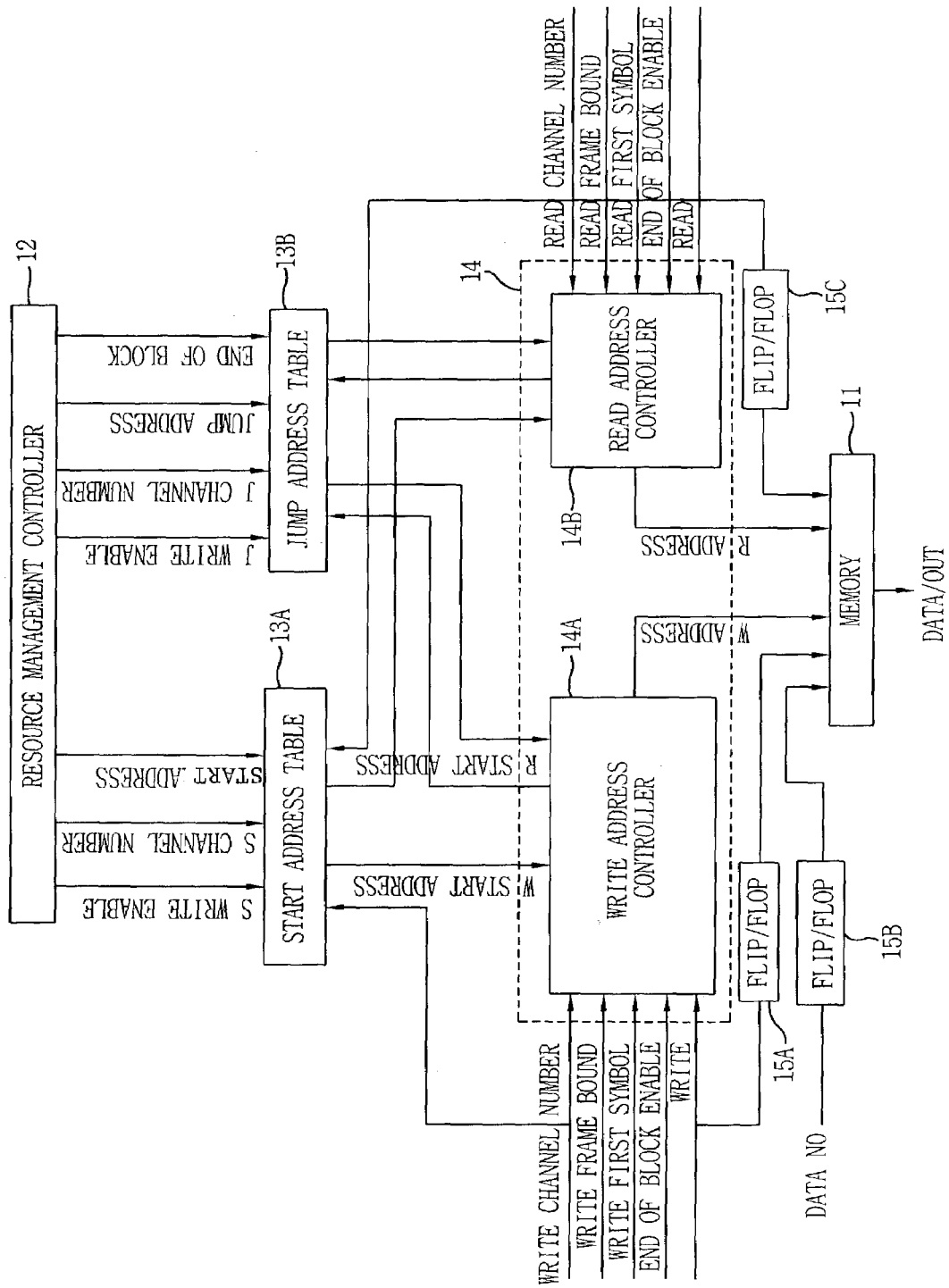
FIG. 1 is a block diagram showing an exemplary embodiment of a memory controlling apparatus in a base station modem according to the present invention.

FIG. 1 is a view showing an exemplary apparatus for controlling a memory in a base station modem according to the present invention. As shown in FIG. 1, the apparatus can include a memory 11 divided into N blocks for supporting multiple users. A resource management controller 12 can allocate the memory 11 to the multi-users. A start address table 13A can store a start point of the memory block allocated by the resource management controller 12. A jump address table 13B can store a point of a memory block next to the memory block allocated to the respective multi-user. An address controller 14 operates on information of the start address table 13A and of the jump address table 13B and a request by an outer signal.

The address controller 14 includes a read address controller 14B and a write address controller 14A having the same configurations as each other. Those skilled in the art will appreciate that the configurations of the controllers can also be different or vary slightly, without departing from the spirit and scope of the present invention. However, different signals are connected to the respective address controllers 14A and 14B. One of the signals is connected through flip/flops 15A, 15B and 15C in order to compensate for a difference of operation time between the read/write address controllers 14B and 14A.

Among the signals inputted into the read address controller 14B, "read" is a signal requiring read operation, "read first symbol" is a signal that indicates a first read request to the present user, "read frame bound" is a signal for notifying that the present read request exists in a frame boundary, "end of block enable" is a signal for enabling an end of block bit in the jump address table 13B, and "read channel number" is a number for classifying the channel.

Also, among the signals inputted into the write address controller 14A, "write" is a signal for requiring write operation, "write first symbol" is a signal for first write request to the present user, "write frame bound" is a signal for notifying that the present write request exists in a frame boundary, "end of block enable" is a signal for enabling an end of block bit in the jump address table 13B, and "write channel number" is a number for classifying channels.

FIGS. 2 and 3 show an exemplary embodiment of a start address table format and a jump address table format. Those skilled in the art will appreciate that other storage formats besides address tables can be used to store information in memory locations.

FIG. 2 shows an exemplary case of a modem that can support 16 users, where the start address table can be divided into 16 blocks. That is, in case of the modem for N users, there should be N start addresses, and the respective start address in the start address table should be a size that can represent the total number of memory blocks available.

As shown in FIG. 3, the jump address table can be divided into a jump address area and an end of block. The jump address table may be sized to accommodate the number of resources allocated to the memory, and is divided into 16 blocks in the exemplary embodiment shown in FIG. 3.

FIG. 4 shows an exemplary embodiment of a format of the memory shown in FIG. 1.

The memory is preferably divided logically as shown in FIG. 4 in order to use the memory effectively. The right parts of the memory can be respectively divided into 16 blocks and can represent the lower address sections of the memory. The left parts bundling the 16 blocks respectively can represent 1024 upper address sections of the memory. The lower address section can be an offset address, and the upper address section can be a block address. An offset address preferably exists for as many as the number of resources allocated as the jump address, and the block address can be the maximum size value of the resource.

Figure 5:
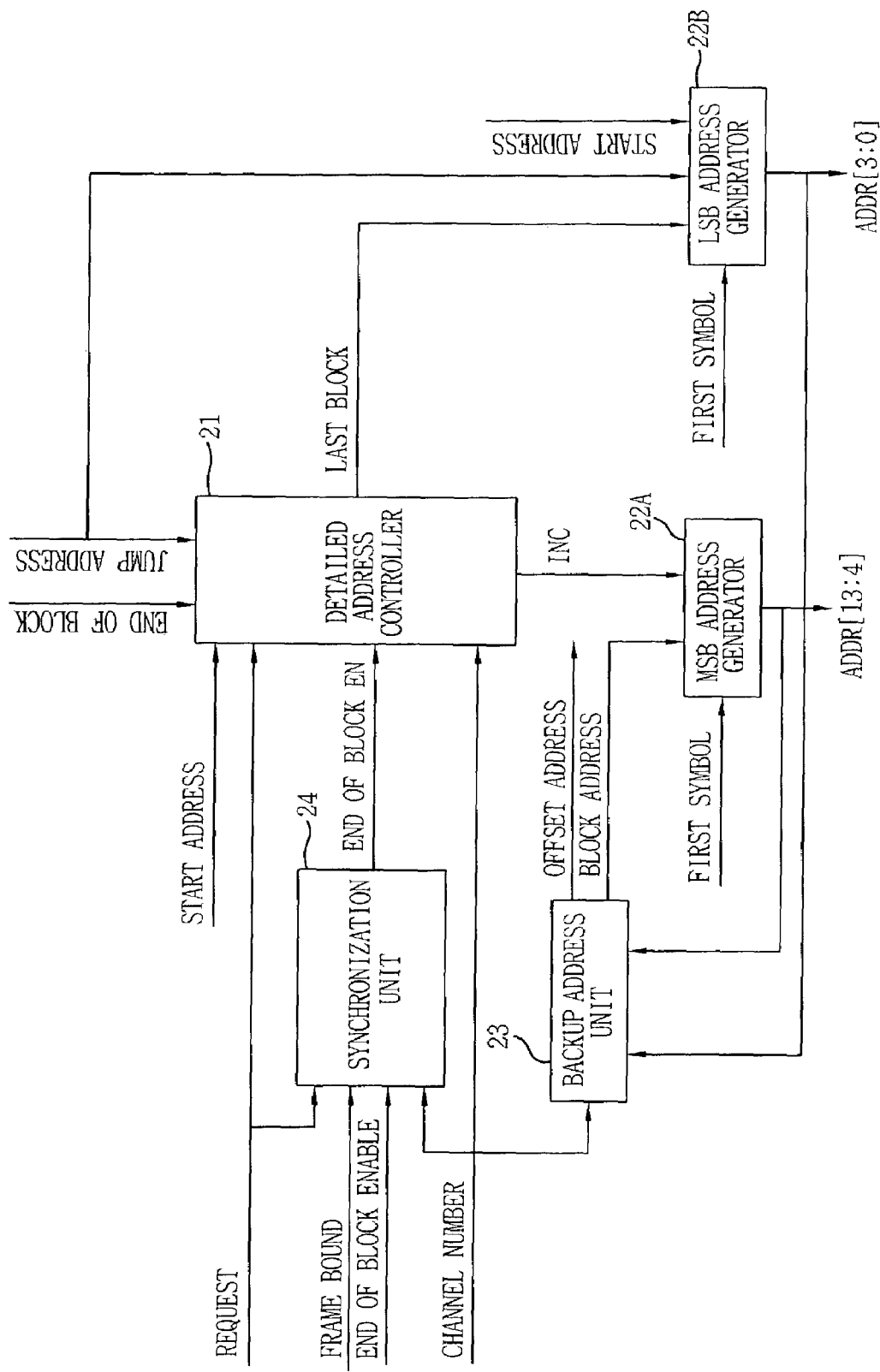
FIG. 5 is a block diagram showing an exemplary embodiment of an address controller according to the present invention.

FIG. 5 is a block diagram showing an exemplary embodiment of an address controller according to the present invention. The apparatus can control the read/write operations of the memory by information residing in the start/jump address table and request by an outer signal, and controls the addresses of the memory.

As shown in FIG. 5, the address controller can include a detailed address controller 21 for generating a control signal for calculating the address of the memory through the signals of the start address table 13A and of the jump address table 13B and the end of block En signal; a most significant bit (MSB) address generator 22A can calculate the block address; a least significant bit (LSB) address generator 22B can calculate the offset address; and a backup address unit 23 can store the write address or the read address of the memory corresponding to the respective user. A synchronization unit 24 synchronizes to the signal that is preferably a reference for re-allocating the memory to the respective user.

The reference signal of the synchronization unit 24 can be frame bound and the synchronization is preferably made based on the signal to perform the memory re-allocation to the respective user. In addition, the block address and the offset address exist for as many as the number of receivers that are respectively accommodated in the backup address unit 23 such as shown in FIG. 6.

Among those signals inputted into the address controller 21, a request corresponds to the read or write signal of the read/write address controller, a first symbol corresponds to the read first symbol or write first symbol signal, a frame bound signal corresponds to the read frame bound or write frame bound signal, and a channel number corresponds to read channel number or write channel number.

Figure 7:
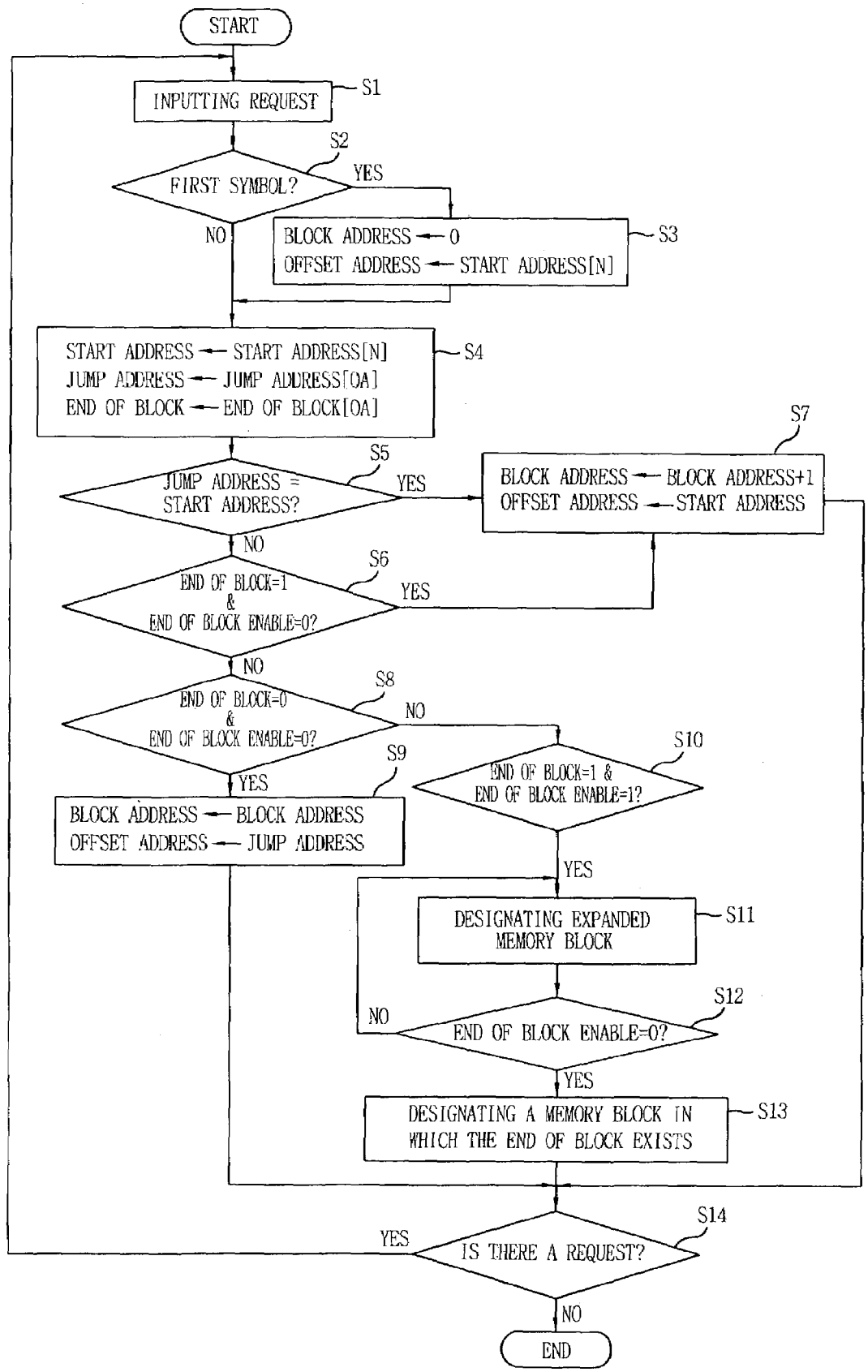
FIG. 7 is a flow chart illustrating an exemplary method for controlling a memory in a base station modem according to the present invention.

FIG. 7 is a flow chart illustrating a method for controlling a memory in the base station modem according to an exemplary embodiment of the present invention. The following method description will center around an inner operation of the address controller.

The inner operation of the address controller can be started by a new request signal (S1). Upon receiving new request signal (S1), the read address controller 14B starts operation by receiving a read request, and the write address controller 14A starts operation by receiving a write request.

When the user inputs a first symbol request (S2), the block address and the offset address stored in the backup address unit 23 are initialized (S3). The block address can be initialized as a start address, and the offset address can be initialized as 0.

In addition, after initializing the block address and the offset address, the next address is calculated using the jump address and the end of block, the end of block enable signal and the start address (S4). At the time corresponding to S4, if the start address and the jump address are the same as each other (S5) or if the end of block is 1 and the end of block enable signal is 0 (S6), the block address can be increased as much as 1 and the offset address is allocated to the start address (S7). However, if the end of block is 0 and the end of block enable signal is 0 (S8), the block address is not changed and the jump address is allocated to the offset address (S9).

When the end of block and the end of block enable signals are all 1 (S10), the jump address corresponding to expanded memory block can be designated (S11). At this point in the process, the end of block is preferably a start point where it is determined whether the next address returns to the allocated data block or moves to the expanded memory block. And the end of block enable signal can be a signal for notifying of using the expanded memory block.

Since the read address controller designates the pointer of the jump address to the expanded memory section, the end of block enable signal is latched and the latched status should be maintained until the next end of block. Operations described above can be performed in the synchronization unit 24 shown in FIG. 5, and the end of block enable signal can be controlled by software (or firmware) in a CPU. In the software, the end of block enable signal is corrected to 1 in a previous frame section, if the memory is to be expanded, and the end of block enable signal is corrected to 0 in the previous frame section, if the expansion of memory is to be stopped, then, the normal operation can be made without incurring time related errors.

When the end of block enable signal becomes 0 during memory use after allocating the expanded memory block as the jump address (S12), the usage of expanded memory is ended at the next frame (S13). In addition, the memory allocating operation is continuously performed while determining whether or not the request signal is input into the system (S14).

Figures 8, 9:
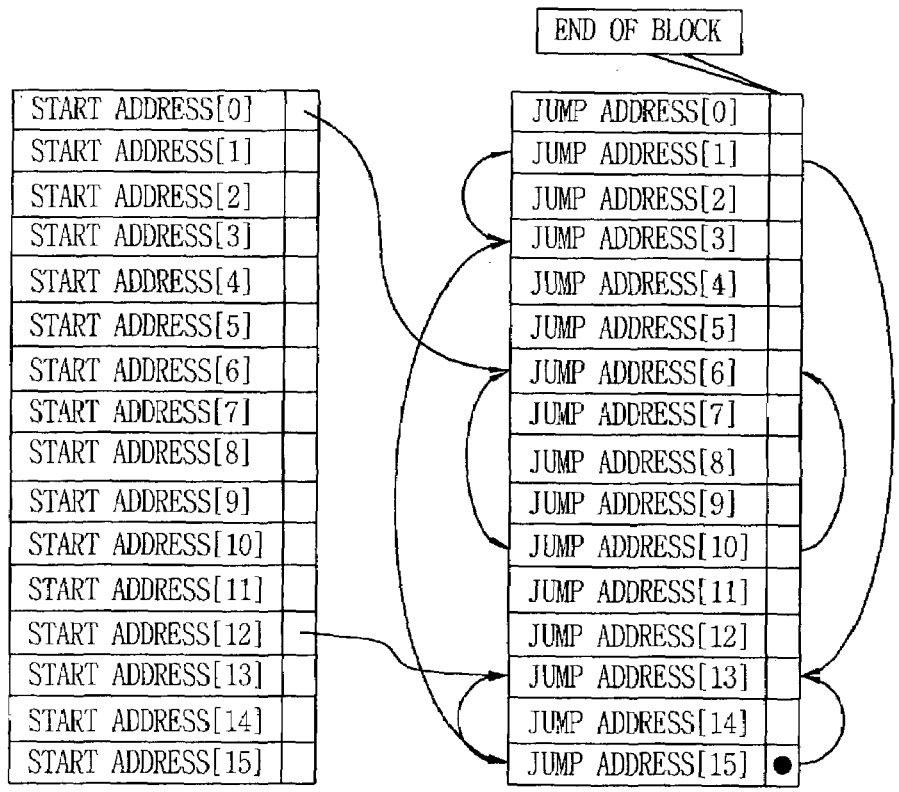
FIG. 8 is a view illustrating exemplary processes for allocating memory in the base station modem according to the present invention.
FIG. 9 is a view showing an exemplary address table according to write operations of the memory according to the present invention.

Operations of the apparatus for controlling memory in the base station modem will now be described with reference to FIGS. 8 through 10. FIG. 8 is a view illustrating exemplary processes of allocating memory in the base station modem. FIG. 9 is a table showing address changes according to a first embodiment of a method for controlling the memory in the base station modem. FIG. 10 is a table showing address changes according to a second embodiment of a method for controlling memory in the base station modem according to the present invention.

In embodiments according to the present invention, the memory is divided into memory block units and allocated to the respective users. The N memories required by the user are allocated into memory block units. Generally, the memory can be allocated to the corresponding user only in case where N continuous memory blocks are available. However, in embodiments according to the present invention, non-continuous memory blocks can also be allocated to the user. Also, the size of the memory that is already allocated can be expanded, reduced or otherwise adjusted.

First, the resource management controller 12 can allocate the non-continuous memory blocks by respective users to the users. In an exemplary embodiment, it is assumed that the user is using Block[0], Block[1], Block[2], Block[3], Block[4], Block[5], Block[7], Block[8] and Block[9] in the memory which is divided into 16 blocks Block[0], Block[1], ..., Block[15]. Other allocation schemes may be used without departing from the spirit scope of the present invention.

In the above scenario, when there is a new user requiring two blocks of memory, the resource management controller 12 allocates the available channel to the user. At this point in the process, the channel can be allocated sequentially.

For example, if the channel 0 is not used, the channel 0 is allocated to the new user. After this determination, the memory block for the channel 0 is allocated. That is, the memory block list that can be used sequentially is detected, and then, Block[6] and Block[10] are allocated to channel 0.

[Equation 1]

Start address[0]←6
Jump address[6]←10 End of block[6]←0
Jump address[10]←6 End of block[10]←0

As shown in Equation 1, the Block[6] is one of the blocks allocated to the channel 0 and is designated as the start block, and 6, which is the value designating the start block, is recorded in start address[0] of the start address table as shown in Equation 1. In addition, 10 which is the value designating the next block is stored in the jump address[6]. After this, 6 is stored in the next jump address[10] so as to designate the start block, thereby completing the operations of the resource management controller. The end of block is used when the size of the memory that is already allocated is re-controlled and the stored as 0 in the equation 1.

After the preceding allocations are performed, the write signal is generated in the memory, and a circulating buffer of start address[0]→jump address[6]→jump address[10]→jump address[6]→ ... →jump address[6/10] is formed.

FIG. 9 shows the address changes when the write operation proceeds continuously on a physical memory in the case where the expanded memory block is not used. The values expressed therein are hexadecimal values.

The offset address has the same value as that of the jump address, and the block address is increased as much as 1, whenever the jump address proceeds one cycle. Therefore, the physical address can be calculated by using Equation 2.

[Equation 2]

Physical address←Block address*16+offset address

In the case where the memory size should be increased as corresponding to the generated channel, the memory size is changed through the end of block in the jump address table.

For example, it is assumed that two memory blocks are allocated to the user allocated to the channel 12 (already same as the user allocated to the channel 0) and two more memory blocks are needed during a frame in which the end of block is 1.

The process of allocating memory for the user can be represented as in Equation 3, the same as the user of channel 0.

[Equation 3]

Start address[12]←13
Jump address[13]←15 End of block[13]←0
Jump address[15]←13 End of block[15]←0

After that, when a request signal is generated in the memory, a circulating buffer of start address[12]→jump address[13]→jump address[15]→jump address[13]→ ... → jump address[13/15] is formed. In order to add blocks in the memory, new resources are allocated in accordance with Equation 4.

[Equation 4]

Jump address[3]←1 End of block[3]←0
Jump address[1]←13 End of block[1]←0
Jump address[15]←3 End of block[15]←1

The jump address[15] and the end of block[15] information for the Block[15] which is the last block in the existing allocation list, is updated last. Through the resource allocation processes described above, the memory blocks allocated to the channel 12 increased from 2 to 4. At that time, the increased memory blocks are not used immediately after allocation from the resource management controller 12, but operated only in the section in which the end of block enable signal 1.

FIG. 10 shows examples of conditions where the expanded memory block is used. The next block address is calculated using the jump address and the end of block information of the jump address table.

In the section in which the end of block enable signal is 0, the write operation is performed between the Block[13] which is allocated previously and the Block[15] recursively. At this point in the process, it is determined whether the next address moves to the existing Block[13] from the Block[15] in which the end of block is 1 or moves to the expanded memory block Block[3]. However, since the end of block enable signal is 0, the Block[13] becomes the next address, regardless of the status to the present jump address.

In the section in which the end of block enable signal is 1, the write operation can be performed on the expanded memory block. In the Block[15] in which the end of block enable signal is 1 and the end of block is 1, the expanded memory block Block[3] becomes the jump address. When the value of the end of block enable signal is maintained as 1, the circulating buffer of jump address[3]→jump address[1]→jump address[13]→jump address[15]→jump address[3]→ ... →jump address[15] is formed. At that time, when the end of block enable signal becomes 0 during circulating the expanded memory block, the next address is Block[15].

That is, when the present end of block value is 1 and the end of block enable value is 0, the next address is the start address regardless of the present jump address, and the block address is increased as much as 1. When the end of block value is 1 and the end of block enable value is 1, the next address is the jump address corresponding to the expanded memory block. Also, when the end of block value is 0, the next address is the jump address, and if the next address is coincided with the start address, the block address is increased as much as 1.

As described above, according to embodiments of an apparatus and a method for controlling the memory in the base station modem of the present invention, the memory having dynamic allocation structure operates in the base station modem and enables efficient memory utilization.

Also, according to an apparatus and a method for controlling the memory of the base station modem according to embodiments of the present invention, non-continuous memory allocation can be made, the size of the memory can be increased or reduced using the expanded memory block during operation, and the expanded memory can be controlled easily using software.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of memory management, comprising:
    receiving a request for memory allocation of a base station modem memory that is divided into memory blocks to support multiple mobile terminals; and
    performing memory allocation of continuous and/or non-continuous memory blocks by using jump addresses that point to memory locations of a particular memory block or to memory locations of a different memory block.

2. The method of claim 1, wherein the memory allocation is performed by referring to a tag bit of each jump address that indicates whether an end of a memory block has been reached, and the memory allocation is performed on a per frame basis according to whether an end of frame has been reached.

3. The method of claim 1, wherein the base station modem memory has at least one block address indicating a memory block, at least one offset address indicating a memory location within the memory block, at least one start address indicating a starting memory location, and at least one jump address indicating a next memory location, and
    wherein the performing memory allocation comprises,
        initializing a block address and an offset address according to a start address,
        obtaining a jump address using the offset address,
        obtaining a flag using the offset address,
        if the jump address and the start address are the same, increasing the block address and initializing the offset address to the start address, and
        if the jump address and the start address are not the same,
        if the flag had been set and a frame boundary is not yet reached, increasing the block address and initializing the offset address to the start address, and
        otherwise, assigning the offset address to the jump address.

4. The method of claim 3, wherein the flag indicates whether an end of a memory block has been reached.

5. The method of claim 3, wherein the frame boundary refers to an end of a frame, and memory allocation is performed on a per frame basis with reference to the frame boundary.

6. The method of claim 1, further comprising:
    allocating an available channel to a mobile terminal that requests memory allocation, and one or more memory blocks are allocated for that channel.

7. The method of claim 1, wherein said performing memory allocation is performed at a base station during handover of mobile terminals or during multimedia data processing by at least one mobile terminal.

8. An apparatus for memory management, comprising:
    a base station modem memory being divided into memory blocks to support multiple mobile terminals, each memory block having a block address and each memory location within each memory block having an offset address;
    an address table having stored therein at least one start address indicating a starting memory location and at least one jump address indicating a next memory location;
    an address controller to control addressing during read and/or write operations associated with the memory; and
    a resource management controller, coupled to the memory, the address table, and the address controller, to selectively perform memory allocation of both of continuous or non-continuous memory blocks by using jump addresses that point to memory locations of a particular memory block or to memory locations of a different memory block.

9. The apparatus of claim 8, wherein the memory allocation is performed by referring to a tag bit of each jump address that indicates whether an end of a memory block has been reached, and the memory allocation is performed on a per frame basis according to whether an end of frame has been reached.

10. The apparatus of claim 8, wherein the address controller is configured to start operations responsive to a request signal, and the address controller is configured to initialize a block address and an offset address according to a start address, obtain a jump address using the address table and a flag using the offset address,
    wherein when the jump address and the start address are the same, the address controller increases the block address and the offset address is initialized to the start address, and
    wherein when the jump address and the start address are not the same,
    wherein when the flag had been set and a frame boundary is not yet reached, the address controller increases the block address and initializes the offset address to the start address, and
    otherwise, assigns the offset address to the jump address.

11. The apparatus of claim 10, wherein the flag indicates whether an end of a memory block has been reached.

12. The apparatus of claim 10, wherein the frame boundary refers to an end of a frame, and memory allocation is performed on a per frame basis with reference to the frame boundary.

13. The apparatus of claim 8, further comprising:
    a mobile terminal that requests memory allocation, wherein an available channel is allocated to the mobile terminal and one or more memory blocks are allocated for that channel.

14. The apparatus of claim 8, wherein said resource management controller performs said memory allocation during handover of mobile terminals or during multimedia data processing.

15. A method of memory management, comprising:
    sending a request to a base station for memory allocation of a base station modem memory that is logically divided into memory blocks to support multiple mobile terminals; and
    receiving allocation of an available channel from the base station that allocated one or more memory blocks for that channel and performed memory allocation of each of continuous and non-continuous memory blocks by using jump addresses that point to memory locations of a particular memory block or to memory locations of a different memory block.

16. The method of claim 15, wherein the memory allocation is performed by referring to a tag bit of each jump address that indicates whether an end of a memory block has been reached, and the memory allocation is performed on a per frame basis according to whether an end of frame has been reached.

17. An apparatus for memory management, comprising:
a transmitter in a mobile terminal adapted to send a request to a base station for memory allocation of a base station modem memory that is logically divided into memory blocks to support multiple mobile terminals; and
a receiver in a mobile terminal adapted to receive allocation of an available channel from the base station that allocated one or more memory blocks for that channel and selectively perform memory allocation of continuous and non-continuous memory blocks by using jump addresses that point to memory locations of a particular memory block or to memory locations of a different memory block.

18. The apparatus of claim 17, wherein the memory allocation is performed by referring to a tag bit of each jump address that indicates whether an end of a memory block has been reached, and the memory allocation is performed on a per frame basis according to whether an end of frame has been reached.

* * * * *